: US011124155B2

United States Patent
Hong et al.

(10) Patent No.: US 11,124,155 B2
(45) Date of Patent: Sep. 21, 2021

(54) WIPER MOTOR MOUNTING STRUCTURE OF VEHICLE

(71) Applicant: DY AUTO Corporation, Asan-si (KR)

(72) Inventors: Sung Jin Hong, Asan-si (KR); Jae Bong Yun, Asan-si (KR)

(73) Assignee: DY AUTO Corporation, Asan-si (KR)

( * ) Notice: Subject to any disclaimer, the term of this patent is extended or adjusted under 35 U.S.C. 154(b) by 82 days.

(21) Appl. No.: 16/683,002

(22) Filed: Nov. 13, 2019

(65) Prior Publication Data
US 2021/0107431 A1  Apr. 15, 2021

(30) Foreign Application Priority Data
Oct. 11, 2019  (KR) .......... 10-2019-0126306

(51) Int. Cl.
*B60S 1/04* (2006.01)
*F16B 19/10* (2006.01)
*F16B 21/07* (2006.01)
*F16B 17/00* (2006.01)

(52) U.S. Cl.
CPC .......... *B60S 1/0438* (2013.01); *B60S 1/0447* (2013.01); *F16B 17/00* (2013.01); *F16B 19/10* (2013.01); *F16B 21/073* (2013.01); *F16B 21/07* (2013.01)

(58) Field of Classification Search
CPC ........ F16B 19/10; F16B 21/073; F16B 21/07; Y10T 24/309; Y10T 24/44026; B60S 1/0447; B60S 1/0438

USPC ...................................................... 296/96.17
See application file for complete search history.

(56) References Cited

U.S. PATENT DOCUMENTS

| | | | |
|---|---|---|---|
| 2006/0171793 A1* | 8/2006 | Kawai ................ | F16B 19/1081 411/45 |
| 2008/0022476 A1 | 1/2008 | Kraus et al. | |
| 2016/0053795 A1* | 2/2016 | Goldberg ............ | F16B 19/1081 411/500 |

FOREIGN PATENT DOCUMENTS

| | | |
|---|---|---|
| JP | 2006525163 | 11/2006 |
| JP | 2011195124 | 10/2011 |
| JP | 2017096449 | 6/2017 |

OTHER PUBLICATIONS

Office Action for Korean Application No. 10-2019-0126306, dated Dec. 10, 2020 (w/English translation).

* cited by examiner

*Primary Examiner* — Dennis H Pedder
(74) *Attorney, Agent, or Firm* — Klarquist Sparkman, LLP (57) ABSTRACT

A wiper motor mounting structure of a vehicle, as a structure for assembling a vehicle wiper motor and a vehicle body panel, includes: a motor mounting bracket; and a fixing member fixing the motor mounting bracket to a vehicle body panel, wherein the motor mounting bracket includes a plurality of mounting portions, one of the plurality of mounting portions is fixed to the vehicle body panel by a screw and the other ones of the plurality of mounting portions are fixed to the vehicle body panel by an assembly pin capable of one-touch push assembly.

3 Claims, 7 Drawing Sheets

WIPER MOTOR MOUNTING STRUCTURE OF VEHICLE

CROSS-REFERENCE TO RELATED APPLICATION

This application claims the benefit of Korean Patent Application No. 10-2019-0126306, filed on Oct. 11, 2019, in the Korean Intellectual Property Office, the disclosure of which is incorporated herein in its entirety by reference.

BACKGROUND

1. Field

One or more embodiments relate to a wiper motor mounting structure of a vehicle, and more particularly, to a wiper motor mounting structure of a vehicle in which assembly is improved and weight is reduced.

2. Description of the Related Art

In general, a wiper of a vehicle is a safety device for securing the driver's vision by wiping a windshield glass with a wiper blade when the driver's vision becomes poor due to weather conditions such as rainfall or snowfall or due to dust, stains, or the like put on the windshield glass. Wipers may be installed at vehicle windshields as well as rear windows, outside rear-view mirrors, head lamps, and the like.

Such a wiper includes a wiper motor used as a driving source. As for a wiper motor, as disclosed in Korean Patent No. 1319554, a bracket to which a motor is coupled may be coupled to a vehicle body panel by a screw.

Figure 1:
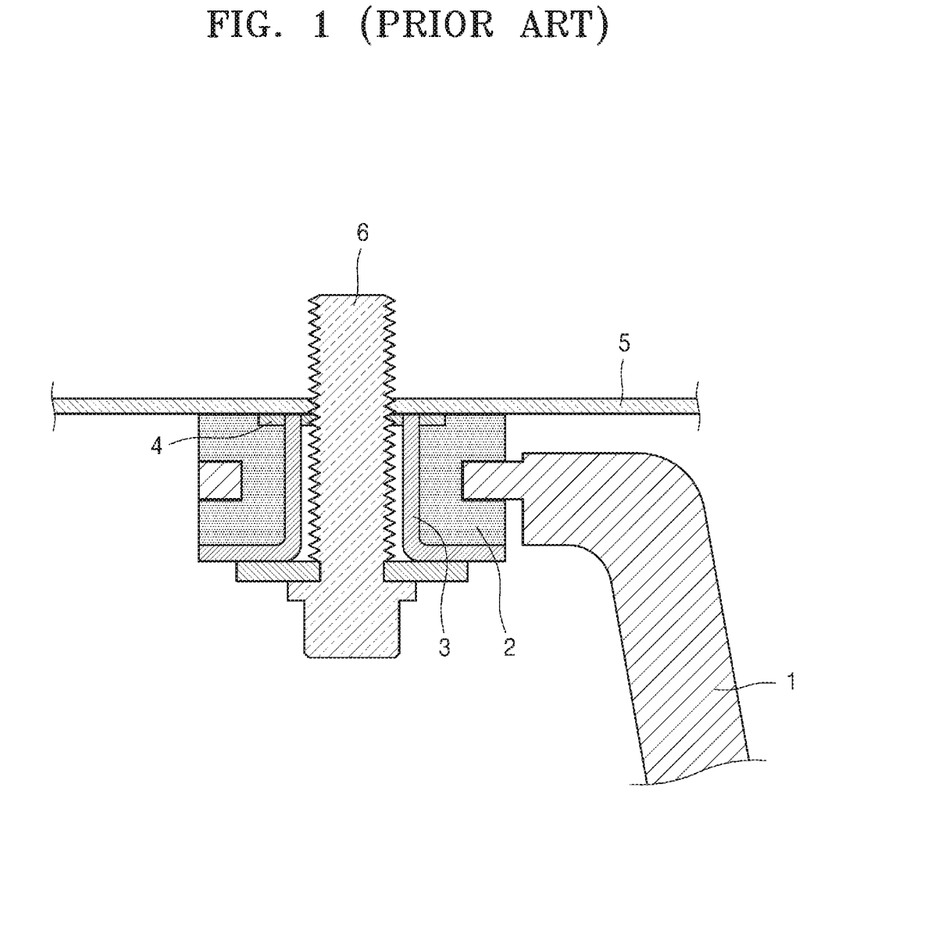
FIG. 1 is a cross-sectional view illustrating a screw assembly structure of a motor mounting bracket and a vehicle body panel according to the related art.

In general, a motor mounting bracket is fixed to a vehicle body panel at three points. In general, as illustrated in FIG. 1, in a structure for coupling a motor mounting bracket and a vehicle body, a mounting rubber 2 is coupled to a motor mounting bracket 1 and a bush 3, a paper washer 4, and a screw 6 are included to fix the mounting rubber 2.

However, in the case of a mere structure in which the motor mounting bracket 1 is coupled to a vehicle body panel 5 by a screw method as above, because a large number of assembly components are required and a considerable amount of time is required for assembly by the screw 6, the assembly thereof may be poor and inefficient.

In the case of a structure in which a rectangular mounting hole is formed at a vehicle body panel and a motor mounting bracket is rotated and coupled to a vehicle body as disclosed in Korean Patent No. 1319554, the motor mounting bracket and the vehicle body may be unexpectedly separated from each other due to a low coupling strength therebetween.

One or more embodiments include a wiper motor mounting structure of a vehicle in which assembly is improved and assembly component weight is reduced by improving an assembly structure between a vehicle wiper motor and a vehicle body panel.

Additional aspects will be set forth in part in the description which follows and, in part, will be apparent from the description, or may be learned by practice of the presented embodiments of the disclosure.

According to one or more embodiments, a wiper motor mounting structure of a vehicle, as a structure for assembling a vehicle wiper motor and a vehicle body panel, includes;

a motor mounting bracket to which a wiper motor is coupled; and a fixing member fixing the motor mounting bracket to a vehicle body panel, wherein the motor mounting bracket includes a plurality of mounting portions, one of the plurality of mounting portions is fixed to the vehicle body panel by a screw and the other ones of the plurality of mounting portions are fixed to the vehicle body panel by an assembly pin capable of one-touch push assembly, and the assembly pin includes: an outer pin member arranged to pass through the vehicle body panel and including a hollow portion formed by a plurality of bending portions of a cantilever shape; and an inner pin member fixing the mounting portion and the vehicle body panel to each other by passing through the hollow portion to get the bending portion to be bent more toward an upper portion thereof.

The outer pin member may further include a split slot splitting the plurality of bending portions from each other and a plate-shaped base portion extending outward from a lower portion of the bending portion.

The inner pin member may include:

a head portion of a plate shape;

a pressing body extending from the head portion toward the hollow portion; and a sliding guide formed to protrude from an outer peripheral surface of the pressing body and formed to extend long to correspond to a position of the split slot, The wiper motor mounting structure may further include a pair of separation preventing jaws formed at the sliding guide at a certain interval such that the inner pin member and the outer pin member are not separated from each other in a pre-assembled state thereof.

An upper portion of a pair of bending portions arranged to face each other among the plurality of bending portions may include a bending guide portion formed to protrude inward such that a longitudinal section thereof forms an arch-shaped structure to form a hollow portion narrower than a thickness of the inner pin member.

An upper end portion of the pressing body may include a vibration preventing groove portion preventing the outer pin member from vibrating in an axial direction of the hollow portion by accommodating a tip end portion of the bending guide portion to prevent the inner pin member from vibrating in a direction of being separated from the outer pin member in a state where the inner pin member is completely assembled to the outer pin member.

The upper end portion of the pressing body may form a dome-shaped longitudinal-section structure to correspond to a lower surface of the bending guide portion.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of the present disclosure will be described in detail with reference to the accompanying drawings.

Figure 2:
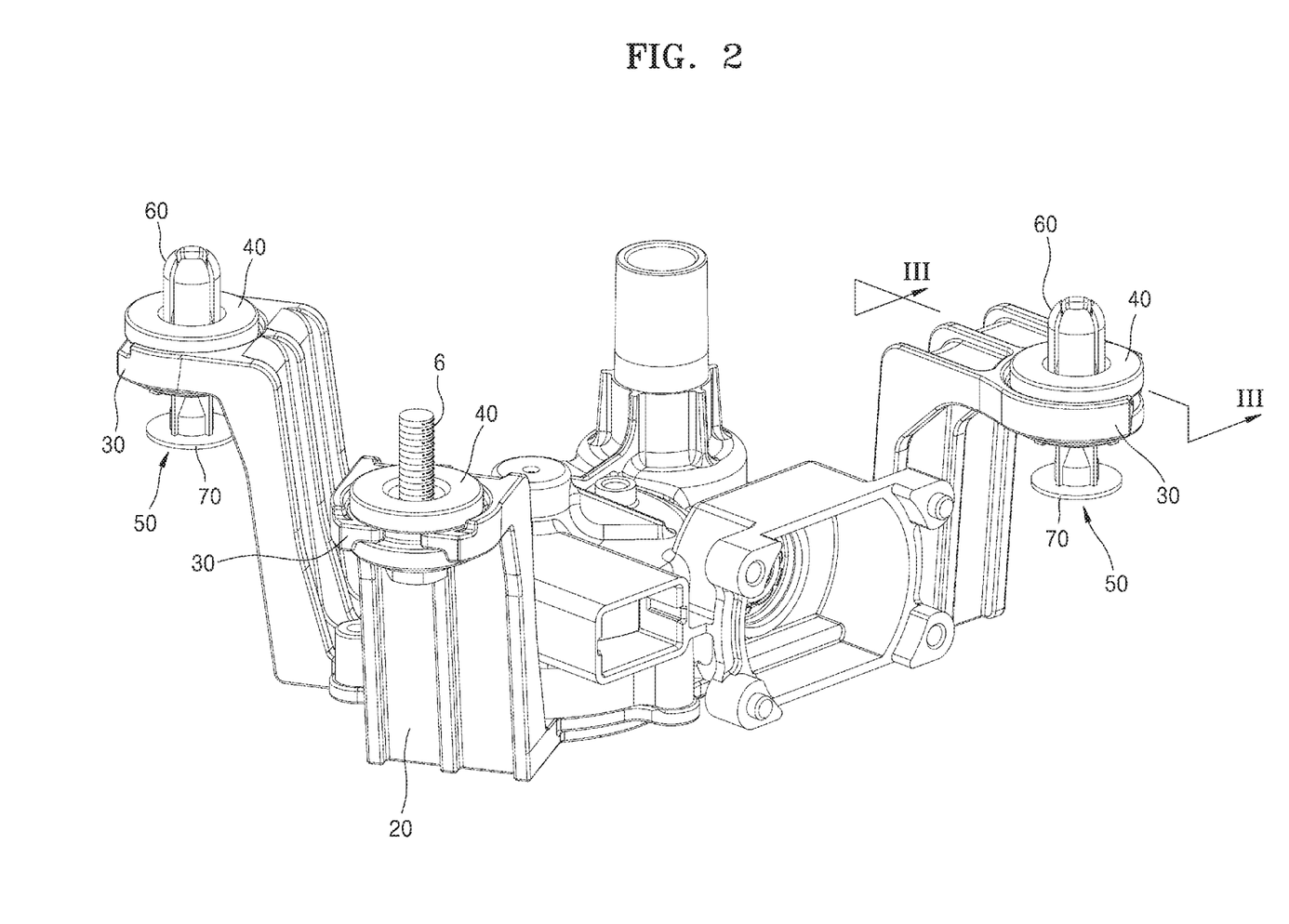
FIG. 2 is a diagram illustrating a coupling structure of a motor mounting bracket and an assembly pin for describing a wiper motor mounting structure of a vehicle according to an example embodiment of the present disclosure.
Figure 3:
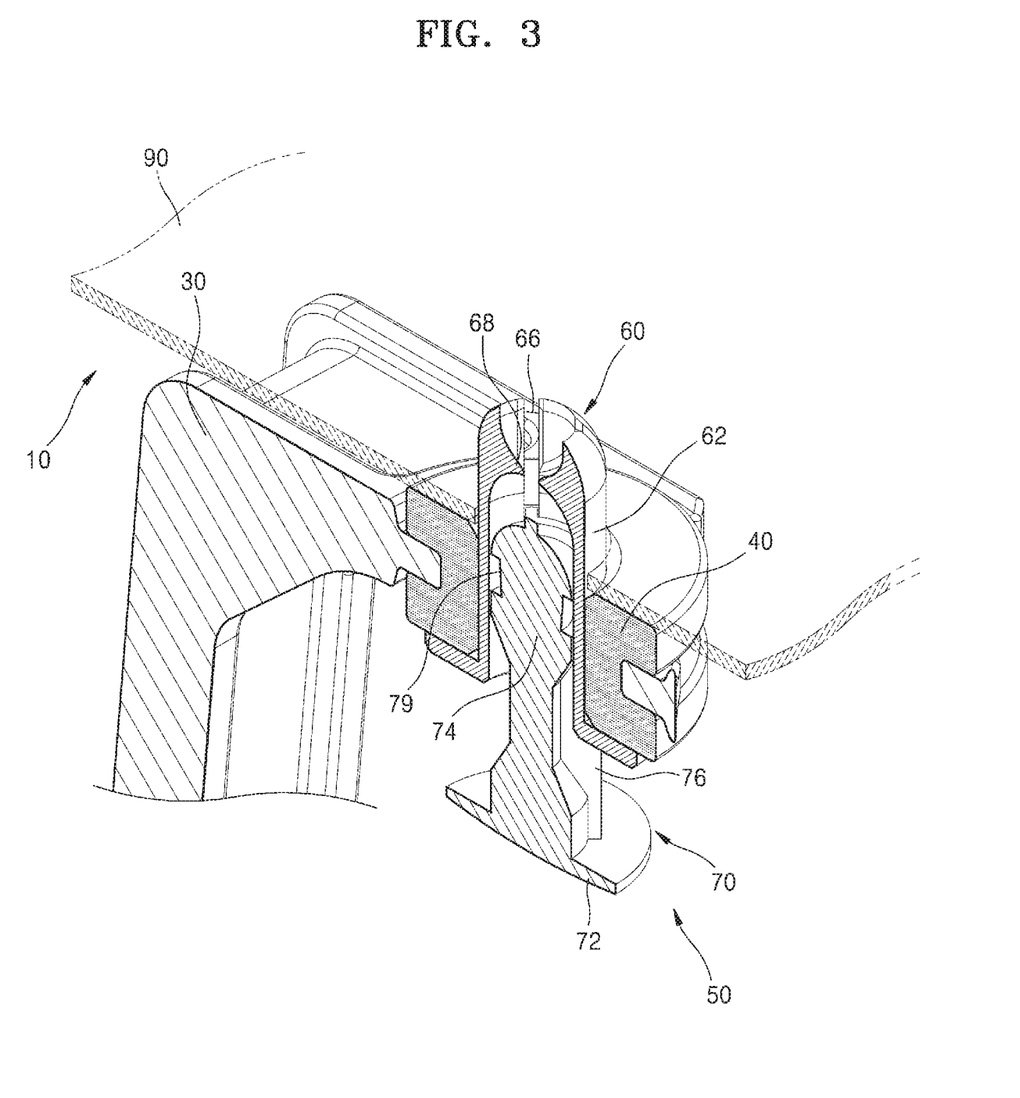
FIG. 3 is a cross-sectional view taken along a line III-III in FIG. 2.
Figure 4:
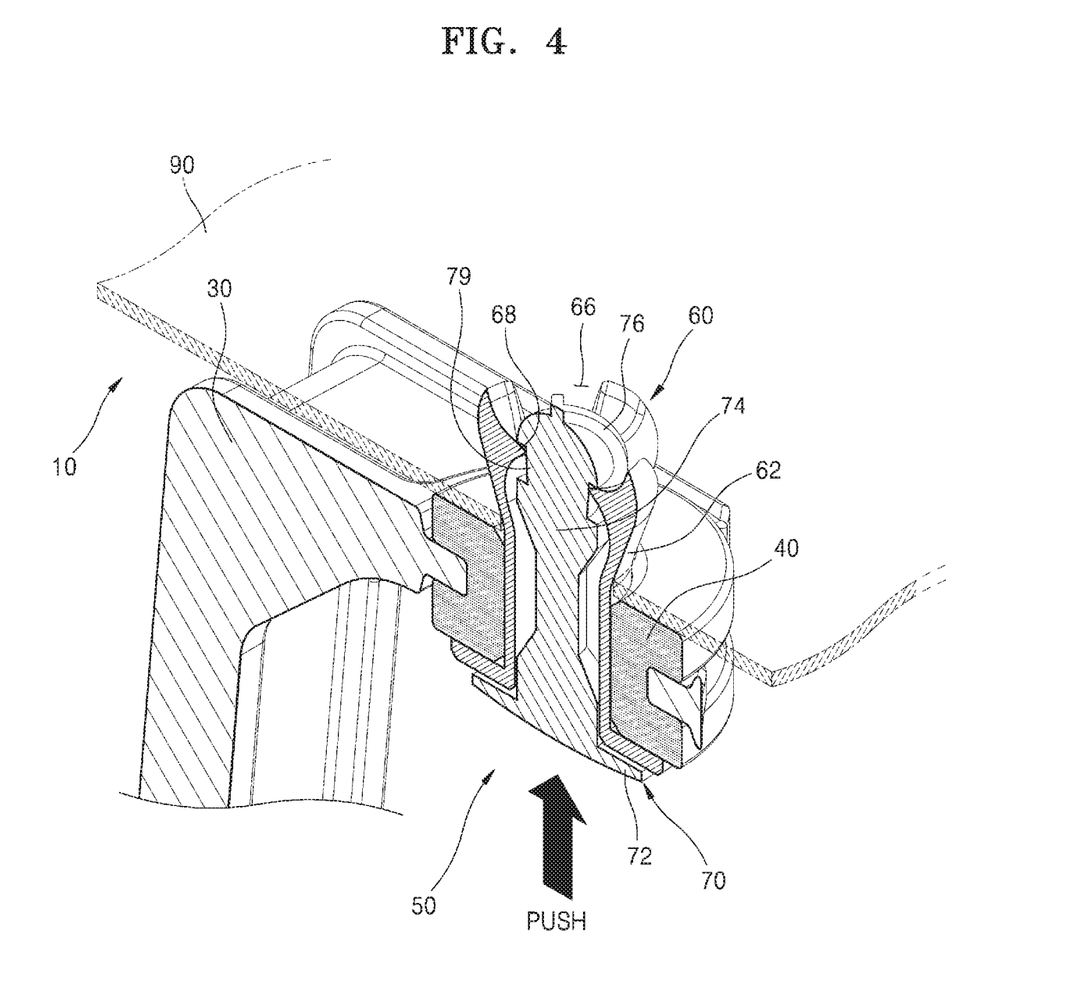
FIG. 4 is a diagram illustrating a state in which the assembly pin illustrated in FIG. 3 is completely assembled.
Figure 5:
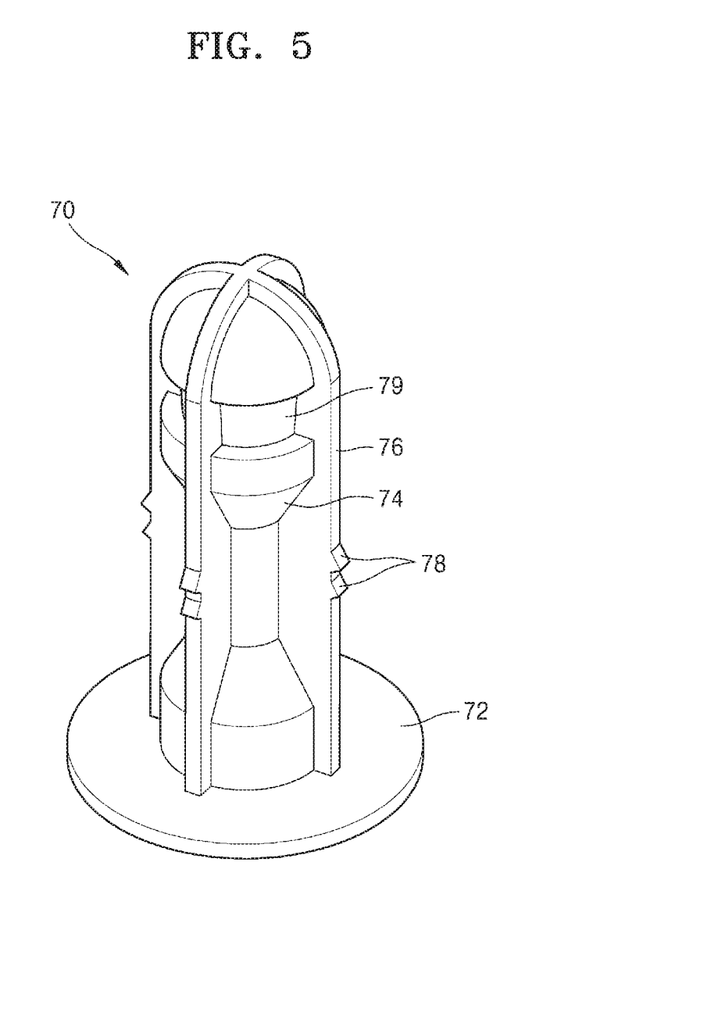
FIG. 5 is a diagram illustrating a three-dimensional structure of an inner pin member constituting the assembly pin illustrated in FIG. 2.
Figure 6:
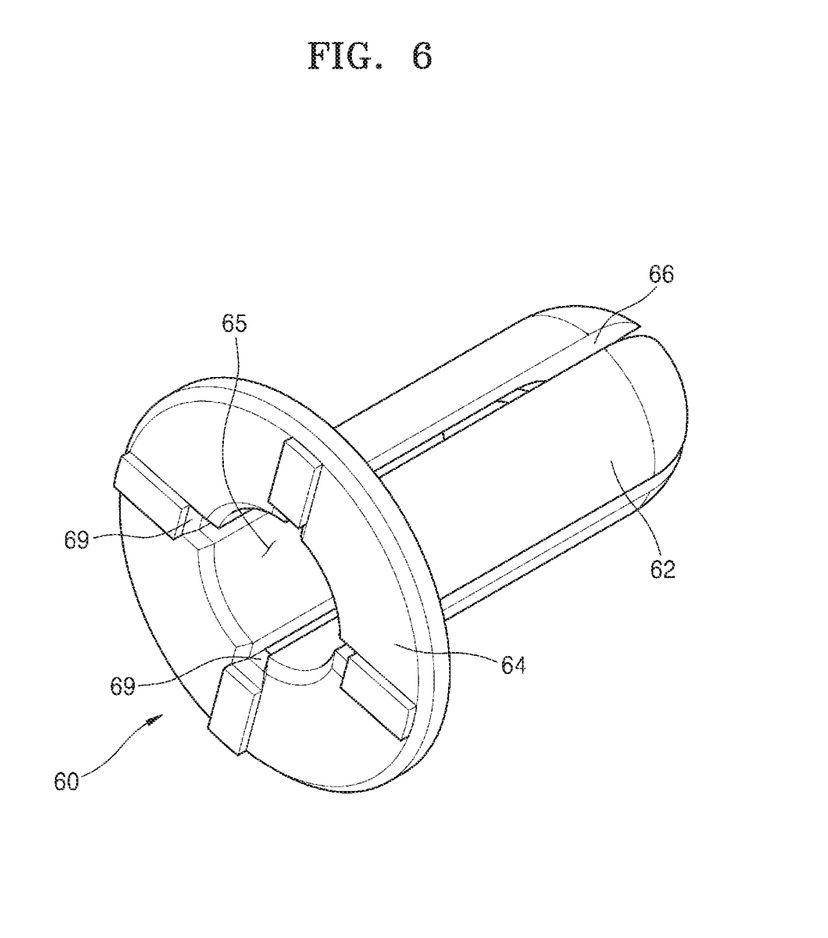
FIG. 6 is a diagram illustrating a three-dimensional structure of an outer pin member constituting the assembly pin illustrated in FIG. 2.

FIG. 2 is a diagram illustrating a coupling structure of a motor mounting bracket and an assembly pin for describing a wiper motor mounting structure of a vehicle according to an example embodiment of the present disclosure. FIG. 3 is a cross-sectional view taken along a line III-III in FIG, 2. FIG. 4 is a diagram illustrating a state in which the assembly pin illustrated in FIG. 3 is completely assembled. FIG. 5 is a diagram illustrating a three-dimensional structure of an inner pin member constituting the assembly pin illustrated in FIG. 2. FIG. 6 is a diagram illustrating a three-dimensional structure of an outer pin member constituting the assembly pin illustrated in FIG. 2. FIG, 7 is a cutaway view illustrating a state in which an inner pin member constituting an assembly pin constituting the present disclosure is pre-assembled to an outer pin member.

Referring to FIGS. 2 to 7, a wiper motor mounting structure 10 of a vehicle (hereinafter referred to as "wiper motor mounting structure 10") according to an example embodiment of the present disclosure may be a structure for assembling a vehicle wiper motor and a vehicle body panel 90.

The wiper motor mounting structure 10 may include a motor mounting bracket 20 and a fixing member.

A wiper motor (not illustrated) may be installed and fixed to the motor mounting bracket 20. The motor mounting bracket 20 may include a plurality of mounting portions 30. One of the plurality of mounting portions 30 may be fixed to the vehicle body panel 90 by a screw 6. A mounting structure of the mounting portion 30 fixed to the vehicle body panel 90 by the screw 6 may use the structure of the related art illustrated in FIG. 1. In addition, the other ones of the plurality of mounting portions 30 may be fixed to the vehicle body panel 90 by an assembly pin 50 capable of one-touch push assembly. In the present embodiment, the screw 6 and the assembly pin 50 will be collectively defined and referred to as a "fixing member". Thus, the fixing member may be a member for fixing the motor mounting bracket 20 to the vehicle body panel 90.

One of the features of the present disclosure may be that one of the plurality of mounting portions 30 may necessarily be assembled to the vehicle body panel 90 by the screw 6 and the other mounting portions 30 may be assembled to the vehicle body panel 90 by the assembly pin 50 capable of one-touch push assembly.

The assembly pin 50 may include an outer pin member 60 and an inner pin member 70, The outer pin member 60 may be arranged to pass through the vehicle body panel 90. The vehicle body panel 90 may be provided with a circular hole. The outer pin member 60 may include a bending portion 62, a base portion 64, a split slot 66, and a bending guide portion 68.

The bending portion 62 may be a cantilever-shaped structure extending from the base portion 64 in the assembly direction of the assembly pin 50. The bending portion 62 may be provided as a plurality of bending portions 62. In the present embodiment, four bending portions 62 may be provided. The bending portions 62 may be spatially separated from each other by the split slot 66. The bending portions 62 may be arranged in a circle such that an inner space thereof may form a hollow portion 65. The inner pin member 70 may be slidingly coupled to the hollow portion 65.

The base portion 64 may be a plate-shaped structure extending outward from a lower portion of the bending portion 62. The base portion 64 may contact and be supported by one side surface of a mounting rubber 40 coupled to the mounting portion 30. The mounting rubber 40 may absorb noise and vibration by elastically supporting the mounting portion 30 such that the mounting portion 30 and the vehicle body panel 90 may not directly contact each other.

The split slot 66 may be a linear space formed to extend in the assembly direction of the assembly pin 50 to split the bending portions 62 from each other. A sliding guide 76 of the inner pin member 70 described below may be coupled to the split slot 66.

An entry taper portion 69 may be provided at a position where the base portion 64 and the split slot 66 intersect each other. The entry taper portion 69 may be a ramp-shaped structure that connects a lower end portion of the split slot 66 from the base portion 64. The entry taper portion 69 may induce easy entry in the assembly direction of a separation preventing jaw 78 provided at the inner pin member 70 described below.

The bending guide portion 68 may be a structure protruding inward from an upper inner wall of the bending portion 62. The bending guide portion 68 may protrude inward to form a hollow portion narrower than the thickness of the inner pin member 70 described below. A longitudinal section of a pair of bending guide portions 68 arranged to face each other among the bending guide portions 68 may form an arch-shaped structure. More particularly, both the upper and lower surfaces of the pair of bending guide portions 68 arranged to face each other may form an arch-shaped structure on the longitudinal section. A pair of arch-shaped structures formed at the bending guide portions 68 may be arranged to vertically face each other substantially in a mirror image. The bending guide portion 68 may induce an upper portion of the bending portion 62 to be easily elastically bent outward when a pressing body 74 of the inner pin member 70 is slidingly coupled along the hollow portion 65.

The inner pin member 70 may be a member for fixing the mounting portion 30 and the vehicle body panel 90 to each other by passing through the hollow portion 65 to get the bending portion 62 to be bent more toward an upper portion thereof.

The inner pin member 70 may include a head portion 72, a pressing body 74, a sliding guide 76, a separation preventing jaw 78, and a vibration preventing groove portion 79.

The head portion 72 may be a plate-shaped structure. The head portion 72 may be arranged to contact the base portion 64 in a state where the outer pin member 60 and the inner pin member 70 are completely coupled. The head portion 72 may be a portion pressed by an operator's finger.

The pressing body 74 may be a rod-shaped structure extending from the head portion 72 toward the hollow portion 65 in the lengthwise direction of the hollow portion 65. An upper portion of the pressing body 74 may form a dome-shaped structure. More particularly, an upper end portion of the pressing body 74 may form a dome-shaped longitudinal-section structure to correspond to a lower surface of the bending guide portion 68.

The sliding guide 76 may be a rail-shaped structure protruding long on a side surface of the pressing body 74. The sliding guide 76 may be formed to extend long to correspond to the position of the split slot 66. In the present embodiment, four sliding guides 76 may be provided. Upper end portions of the sliding guides 76 may be connected to each other along the dome-shaped structure formed at the pressing body 74. The sliding guide 76 may increase the rigidity of the pressing body 74 and simultaneously induce the inner pin member 70 to be naturally slidingly coupled in the lengthwise direction of the outer pin member 60.

Figure 7:
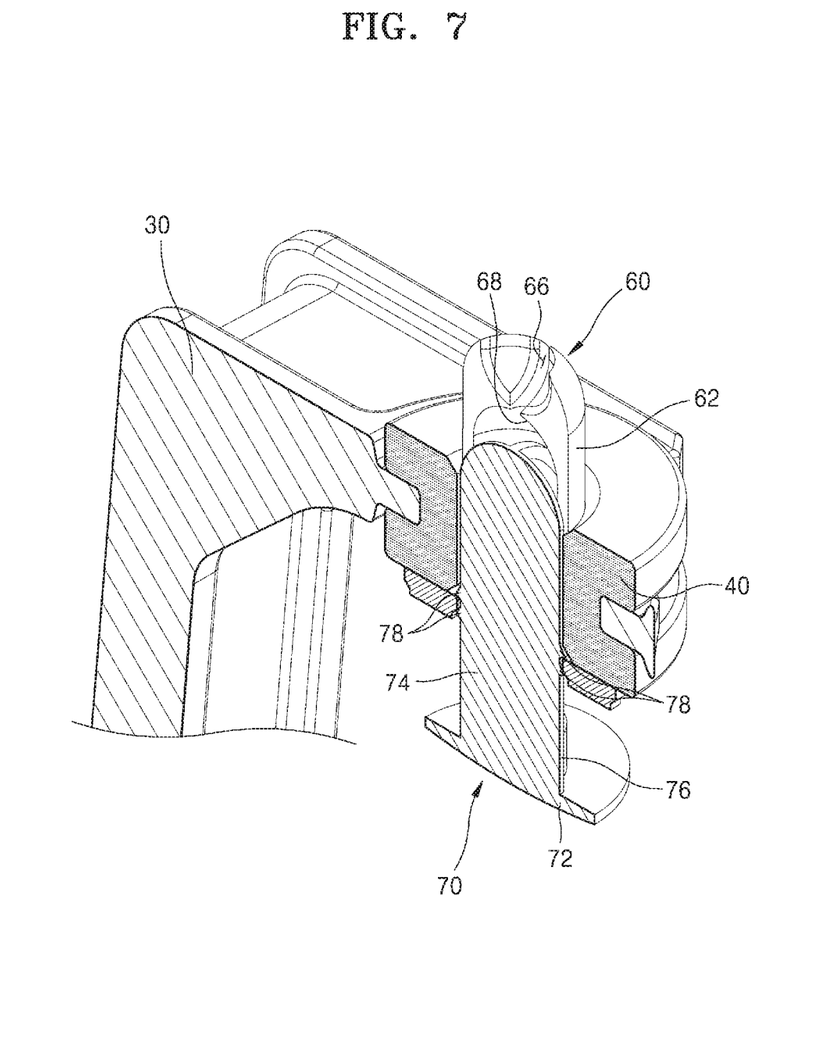
FIG. 7 is a cutaway view illustrating a state in which an inner pin member constituting an assembly pin constituting the present disclosure is pre-assembled to an outer pin member.

The separation preventing jaw 78 may be formed at the sliding guide 76. The separation preventing jaw 78 may be provided such that the inner pin member 70 and the outer pin member 60 may not be separated from each other in a pre-assembled state. The separation preventing jaw 78 may be provided as at least a pair of separation preventing jaws 78. The separation preventing jaw 78 may include a pair of sawtooth-shaped structures formed at a certain interval. The inner pin member 70 and the outer pin member 60 may be packaged and transported in a state of being pre-assembled by the inner pin member 70 and thus the inner pin member 70 and the outer pin member 60 may not be separated from each other in this process.

The vibration preventing groove portion 79 may be provided at a side surface of the upper end portion of the pressing body 74. The vibration preventing groove portion 79 may prevent the inner pin member 70 from vibrating in the assembly/separation direction to/from the outer pin member 60 in a state where the inner pin member 70 is completely assembled to the outer pin member 60. That is, the vibration preventing groove portion 79 may accommodate a tip end portion of the bending guide portion 68 to prevent the outer pin member 60 from vibrating in the axial direction of the hollow portion 65. More particularly, the vibration preventing groove portion 79 may accommodate an inner end portion of the bending guide portion 68. The inner end portion of the bending guide portion 68 may be caught in the vibration preventing groove portion 79 to restrict the movement thereof in the vertical direction.

Hereinafter, the operation and effect of the present disclosure will be described in detail by taking as an example a process of mounting the motor mounting bracket 20 to the vehicle body panel 90 through the wiper motor mounting structure including the above components.

First, a wiper motor (not illustrated) may be assembled to the motor mounting bracket 20. The wiper motor (not illustrated) may be fixed to the motor mounting bracket 20 by a bolt and nut or a screw.

Next, necessary components such as the mounting rubber 40 may be assembled to the mounting portion 30 provided at the motor mounting bracket 20. In this state, the screw 6 may be assembled in a state where one of the mounting portions 30 is arranged to correspond to the hole provided at the vehicle body panel 90. The screw 6 may be directly screw-assembled to the vehicle body panel 90 and thus one mounting portion 30 may be firmly fixed to the vehicle body panel 90.

Next, the assembly pin 50 may be assembled in a state where the other mounting portions 30 and the vehicle body panel 90 are arranged to correspond to each other. The outer pin member 60 constituting the assembly pin 50 may be coupled through the mounting portion 30 to the hole formed at the vehicle body panel 90. In this state, the head portion 72 of the inner pin member 70 may be one-touch pushed and pressed with a finger or a tool. When pressure is applied to the head portion 72 of the inner pin member 70, the separation preventing jaw 78 formed at the inner pin member 70 may be plastically deformed and the pressing body 74 may move slidingly along the inside of the hollow portion 65. In this process, the sliding guide 76 may guide the inner pin member 70 to move linearly. The dome-shaped structure formed at the upper end portion of the pressing body 74 may naturally contact the bending guide portion 68 and push the bending guide portion 68 to the side thereof. Accordingly, an upper end portion of the bending portion 62 may be elastically bent outward. Accordingly, the outer pin member 60 may not be separated from the vehicle body panel 90. Also, the inner end portion of the bending guide portion 68 may be accommodated in the vibration preventing groove portion 79 of the inner pin member 70 in a state where the inner pin member 70 and the outer pin member 60 are completely assembled. In a state where the vibration preventing groove portion 79 and the bending guide portion 68 are coupled, the vibration of the inner pin member 70 may be restricted in the lengthwise direction of the hollow portion 65. Accordingly, the mounting portion 30 may not be separated from the vehicle body panel 90 and the vibration thereof may be well suppressed in the assembly direction of the assembly pin 50.

The other mounting portions 30 may be sequentially fixed to the vehicle body panel 90 by the assembly pin 50. In this way, the wiper motor (not illustrated) may be easily and firmly mounted to the vehicle body panel 90.

As such, according to the wiper motor mounting structure of the present disclosure, because one of the plurality of mounting portions is fixed to the vehicle body panel by the screw and the other mounting portions are fixed to the vehicle body panel by the assembly pin capable of one-touch push assembly, the assembly thereof may be remarkably improved, and because the assembly pin is significantly lighter than the screw, the assembly weight of the wiper motor may be reduced, thereby contributing to the lightweight of the vehicle. In general, the assembly pin of the present disclosure is formed of synthetic resin and thus has a weight of only about 25% of the weight of a motor mounting screw, thereby assisting the lightweight of the vehicle. Also, the present disclosure may be further advantageous for assembly improvement by reducing the possibility of corrosion and reducing the number of assembly components because it does not require a metal bush at a position where the assembly pin is applied.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A wiper motor mounting structure of a vehicle, as a structure for assembling a vehicle wiper motor and a vehicle body panel, the wiper motor mounting structure comprising:
a motor mounting bracket to which the wiper motor is coupled; and
a fixing member for fixing the motor mounting bracket to the vehicle body panel,
wherein the motor mounting bracket includes a plurality of mounting portions,
one of the plurality of mounting portions is fixed to the vehicle body panel by a screw and each of the other ones of the plurality of mounting portions is fixed to the vehicle body panel by a respective assembly pin capable of one-touch push assembly, and the assembly pin includes:
an outer pin member arranged to pass through the vehicle body panel and including:
a hollow portion formed by a plurality of bending portions of a cantilever shape; and
a split slot splitting the plurality of bending portions from each other and a plate-shaped base portion extending outward from a lower portion of the plurality of bending portions; and
an inner pin member fixing the mounting portion and the vehicle body panel to each other by passing through the hollow portion to get the plurality of bending portions to be bent more toward an upper portion thereof and including;
a head portion of a plate shape;
a pressing body extending from the head portion toward the hollow portion; and
a sliding guide formed to protrude from an outer peripheral surface of the pressing body and formed to correspond to a position of the split slot,
wherein an upper portion of a pair of bending portions arranged to face each other among the plurality of bending portions includes a bending guide portion formed to protrude inward such that a longitudinal section thereof forms an arch-shaped structure to form a second hollow portion narrower than a thickness of the inner pin member, and
wherein an upper end portion of the pressing body includes a vibration preventing groove portion preventing the outer pin member from vibrating in an axial direction of the hollow portion by accommodating a tip end portion of the bending guide portion to prevent the inner pin member from vibrating in a direction of being separated from the outer pin member in a state where the inner pin member is completely assembled to the outer pin member.

2. The wiper motor mounting structure of claim 1, further comprising
a pair of separation preventing jaws formed at the sliding guide at a certain interval such that the inner pin member and the outer pin member are not separated from each other in a pre-assembled state thereof.

3. The wiper motor mounting structure of claim 1, wherein
the upper end portion of the pressing body forms a dome-shaped longitudinal-section structure to correspond to a lower surface of the bending guide portion.

* * * * *